United States Patent
Mussell et al.

(12)

(10) Patent No.: US 6,950,057 B1
(45) Date of Patent: Sep. 27, 2005

(54) COMPLEX RADAR TARGET SIMULATOR

(75) Inventors: Paul Mussell, Filton (GB); Malcolm E Fletcher, Filton (GB)

(73) Assignee: MBDA UK Limited, Hertfordshire (GB)

( * ) Notice: Subject to any disclaimer, the term of this patent is extended or adjusted under 35 U.S.C. 154(b) by 153 days.

(21) Appl. No.: 10/247,848

(22) Filed: Sep. 18, 2002

(30) Foreign Application Priority Data

Sep. 19, 2001 (GB) ..................... 0123639

(51) Int. Cl.[7] .............................................. G01S 7/40

(52) U.S. Cl. ..................... 342/170; 342/169; 434/2

(58) Field of Search ................ 342/169, 170; 434/2

(56) References Cited

U.S. PATENT DOCUMENTS

| | | | |
|---|---|---|---|
| 4,467,327 A | | 8/1984 | Drake et al. |
| 4,560,987 A | * | 12/1985 | Dochow et. al. ............ 434/2 |
| 4,660,041 A | | 4/1987 | Maples et al |
| 5,160,264 A | | 11/1992 | Banura et al. |
| 5,892,479 A | | 4/1999 | Mills et al. |

\* cited by examiner

*Primary Examiner*—Ian J. Lobo
(74) *Attorney, Agent, or Firm*—Nixon & Vanderhye P.C.

(57) ABSTRACT

A complex radar target emitter having independent control of three radio frequency (RF) radiation field characteristics, the radiation field characteristics being the real and imaginary components of the complex amplitude of the radiation field, the spatial derivative of the real and imaginary components of the complex amplitude in one of two orthogonal planes, and the spatial derivative of the real and imaginary components of the complex amplitude in the other of the two orthogonal planes.

3 Claims, 1 Drawing Sheet

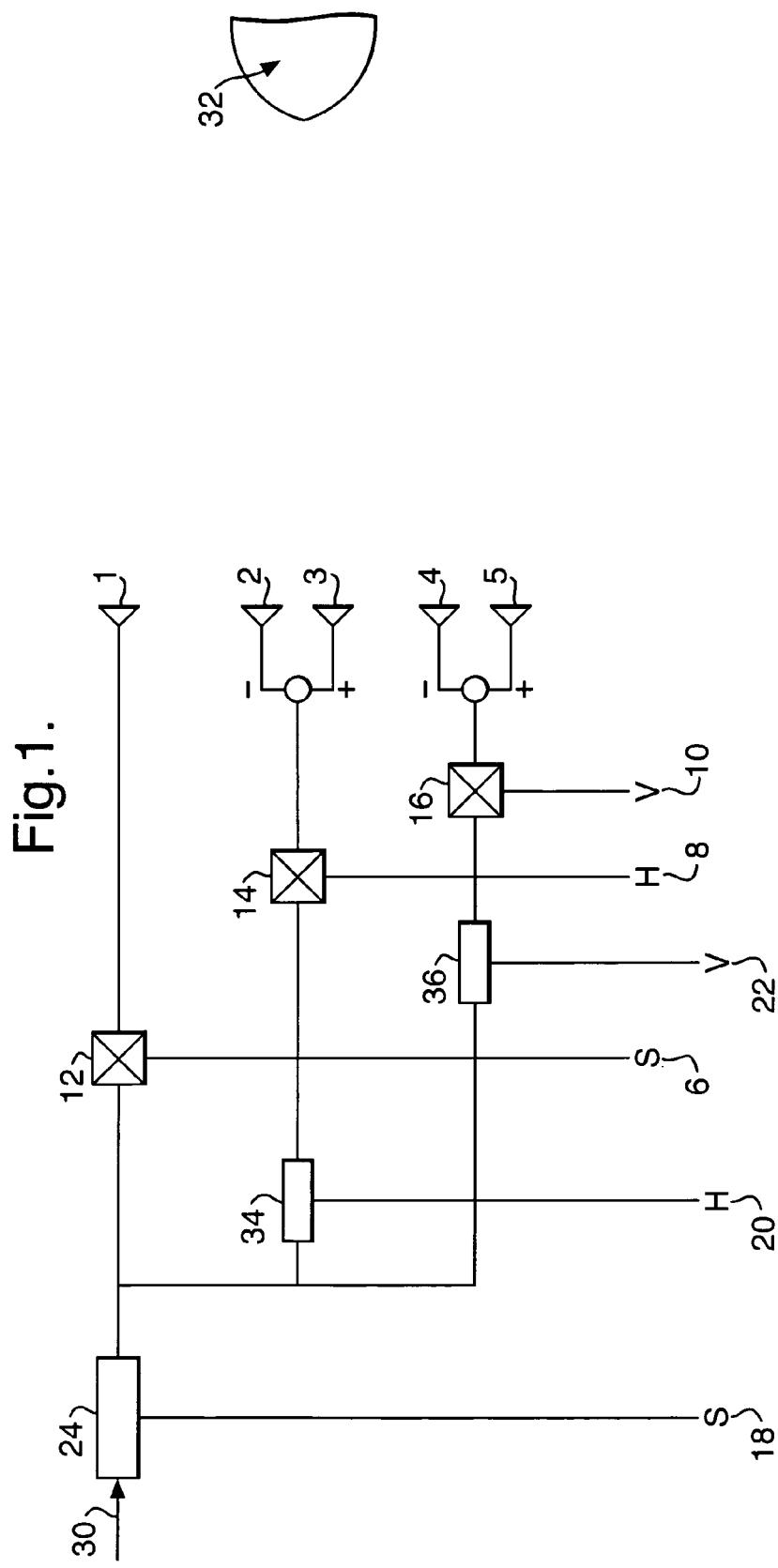

COMPLEX RADAR TARGET SIMULATOR

BACKGROUND OF THE INVENTION

1. Field of the Invention

This invention relates to the field of radar target simulators and more particularly, to such simulators which simulate 'complex' radar targets.

2. Discussion of Prior Art

Hardware in the loop (HWIL or HIL) testing of missiles with active radio frequency (RF) seekers requires the accurate simulation of targets which the seeker or seekers is likely to encounter in service. Such testing is of course significantly cheaper that the live fire testing of such missile systems and as such a significant body of research is now directed towards the development of accurate simulation HWIL test facilities.

A Complex target can be described as a more lifelike target such as an aircraft with its associated extended structure as opposed to a more simple target such as a flat plate reflector or a trihedral corner.

Complex target emitters are used to generate RF signals in space to simulate radar returns from complex radar targets such returns including characteristics such as target scintillation and angle glint fluctuation along with the simulation of radar clutter.

The radar return from a complex radar target fluctuates as the relative positions and orientations of target and seeker change. This is due to effects in the backscatter associated with complex reflecting surfaces. An RF radar seeker must detect its target and provide continuous estimates of the target direction in order to steer a missile to a hit. Target signal fluctuations can influence both the ability to detect the target and the accuracy of any direction measurements.

State of the art radar complex target emitters stimulate their targets by the effective random movement of a bright spot which the seeker tracks. Such emitters provide the effective movement of a bright spot by the use of the controlled variation of the amplitude of RF emissions from typically three or four emitter horns. In order to simulate the required control of the wave front produced by such a system the amplitudes of the emitter horns are varied so as to effectively tilt the wave front.

The phase relationship between the emitter horns in such a system is fixed and therefore the mechanism by which the effective movements of the bright spot are controlled relies solely on the variation of the respective amplitudes generated at the emitter horns and not by virtue of any phase relationship.

State of the art RF seekers may have several receiver channels and therefore in order to provide an accurate simulation of a clutter signal a clutter generator must be able to excite all receiver channels. The current state of the art mechanism by which clutter is introduced into a simulated radar target is by utilising a single RF emitter horn. Such an input can only provide a single angle from which a seeker can receive a signal thereby not producing any angular field change representative of a true return from distributed clutter.

SUMMARY OF THE INVENTION

Accordingly there is provided a complex radar target simulator comprising;
a complex radar target emitter comprising independent control of three radio frequency radiation field characteristics said field characteristics including:
i) the real and imaginary components of the complex amplitude of the radiation field,
ii) the spatial derivative of the real and imaginary components of the complex amplitude in one of two orthogonal planes and,
iii) the spatial derivative of the real and imaginary components of the complex amplitude in the other of said two orthogonal planes.

The orthogonal planes may be the horizontal plane and the vertical plane with respect to a notional ground, for example.

BRIEF DESCRIPTION OF THE DRAWING

A preferred embodiment of the invention in a complex radar target emitter system 5 is presented herebelow in accordance with the FIG. 1.

DETAILED DISCUSSION OF EMBODIMENTS

In a monopulse seeker there are typically three seeker channel variables which combine to provide the information required to continually track a target. The sum channel is excited by the field amplitude, while the azimuth and elevation difference channels are excited by the transverse spatial derivatives of the field amplitude. The emitter unit provides independent control of the separate inputs to these three channels from the external world, including both phases and magnitudes.

As a consequence of varying the field spatial derivatives, the phase front of an RF field may become tilted (i.e. angle glint). RF seekers attempt to determine target direction by estimating the orientation of the phase front by processing the signals in their sum and difference channels. There are different ways of doing this, but they are all sensitive to both the phases and magnitudes of the three signals.

In terms of HWIL testing criteria, in order to assess accuracy of seeker angle measurements it is necessary to control the fluctuations in phases and magnitudes of all three signals. It is not enough as in the state of the art techniques to merely control only the signal magnitude and the orientation of the phase plane because seekers are sensitive to fluctuations in phase as well as magnitude.

The invention provides for a complex radar target emitter which can provide independent control of the three characteristics of the RF radiation field at the seeker required for an accurate and realistic HWIL simulation. The three characteristics which are controlled by the invention are;

1 The complex amplitude of the RF radiation field, (real and imaginary components, equivalently magnitude and phase),
2 The spatial derivative of the complex amplitude in the first of two orthogonal planes, (real and imaginary components), and
3 The spatial derivative of the complex amplitude in the second of the two orthogonal planes, (real and imaginary components).

These are characteristics of the RF field in space, and are independent of the seeker.

Radar returns from clutter, (primarily the ground, but also rain and other unwanted reflectors), interfere with the target signal the seeker uses to detect and track the target. Clutter signals enter all three antenna sum and difference channels, potentially degrading the target direction measurement.

Potentially, clutter returns can arrive from a wide spread of directions. Generating signals from all directions for seeker HWIL tests would require an extensive and costly of emitters.

In the invention the characteristics of the signals to be received by the three seeker antenna channels are calculated and the complex radar target emitter unit can excite signals in all three channels with the correct characteristics simulating as if they were arriving from the full range of directions thereby generating signals with the correct amplitudes and spatial derivatives.

Compensation is applied for angular offsets between the seeker antenna boresight and the direction of the emitter unit.

For radar clutter, the emitter unit provides independent control of the signals in the seeker antenna sum and two difference channels, representing the received clutter signals integrated over all directions, as weighted by the antenna sum and difference polar patterns, with appropriate Doppler spectral profiles and with appropriate correlations between the channels.

An important feature of the invention lies in its use of five radiating horns, with the horns in each of the two outer pairs linked in anti-phase. State of the art emitters generally employ four RF emitter horns, each of which is controlled independently with the required signals distributed between them.

In the following example, the orthogonal planes used are the horizontal and vertical respectively, with respect to a notional ground.

In FIG. 1, the input 30 to the emitter is attenuated by attenuator 24 before being split into one of three paths leading towards the central horn 1, the first pair of outer horns (2,3) or the second pair of outer horns (4,5) respectively. The attenuator 24 controls the mean level of the signal according to the radar range equation. This allows the emitter to simulate targets at various distances from the seeker.

The complex radar target emitter unit controls the field amplitude, using the central horn 1, by the input of the sum of real and imaginery fluctuation components 6 via a vector modulator 12.

The emitter controls the transverse spatial derivatives in the following manner:

The horizontal derivative is controlled, using the first pair of outer horns (2,3) by the input of real and imaginary fluctuation components 8 via a vector modulator 14.

The vertical derivative is controlled, using the second pair of outer horns (4,5), by the input of real and imaginary fluctuation components 10 via a vector modulator 16.

Before arriving at vector modulators (14,16) the input to the emitter 30 is first attenuated by attenuators (34,36) respectively, to ensure that the transverse spatial derivatives have their desired mean amplitudes.

The attenuators 24,34,36 are controlled by inputs 18,20, 22 respectively.

The input to the emitter 30 is typically taken from a sample which has been mixed down, thereby providing the system to work and the processing to be completed at significantly lower frequencies (e.g. in the range of GSM mobile phone technology).

The outer horns 2 & 3 and 4 & 5 are excited in strict anti-phase to ensure that they generate the field derivatives, but consequently do not contribute to the field amplitude received by the seeker 32, where superposition cancels the signals out. The signals radiated from the three sources, namely horn 1, the anti-phase pair 2 & 3, and the anti-phase pair 4 & 5, are modulated independently in both phase and amplitude.

To further ensure an accurate simulation of a complex radar target the modulating signals are obtained from suitable target models, which may comprise either stochastic models generating signals as random variables with the correct statistical distributions and spectral characteristics, or deterministic models based on electromagnetic scattering characteristics of specific target types.

A clutter signal is generated by emitting signals from the three emitter channels, (i.e. horn 1 and two outer anti-phase pairs of horns 2 & 3 and 4 & 5), which are all modulated independently. These modulated signals are calculated such as to excite the required signals in the three receive channels of the seeker, (namely the antenna sum channel and the azimuth and elevation difference channels).

The ability to excite the required internal seeker signals relies on the fact that there is precisely the same number of degrees of freedom in the seeker signals as in the emitter unit signals, i.e. three complex variables in each case, and the seeker variables are related to the emitter unit variables by a (complex) linear transformation which is invertible.

The transformation matrix depends on the relative orientations of the emitter unit and seeker antenna, as well as the seeker antenna polar patterns, and must be computed as a function of the relative orientation of the seeker antenna and emitter unit, depending in turn on the emitter unit position, the orientation of the missile flight table, and the seeker antenna deflection. All of these parameters are required as inputs to the control software. The required seeker signals are obtained from a suitable clutter model, and the emitter unit modulation signals are obtained by applying the inverse of the transformation matrix.

The invention offers numerous benefits over the conventional four horn emitter system including the one to one correspondence between the signals to be generated, (i.e. real and imaginary components of the RF field amplitude and its two spatial derivatives), and the emitter unit channels (i.e. the central channel and two outer channels, with independent control of the real and imaginary components of the signals radiated by each channel). With four horns there is either too much control, (i.e. four complex signals to control only three complex RF field variables), or too little (e.g. fixed phases in the horns, with only amplitude control to apply radar cross section fading and phase front distortion, but not phase fluctuations).

Additionally the invention provides for substantially improved control over the RF field and derivative phases and magnitudes which is afforded by decoupling the emitter unit channels. Thus, where more than one horn is needed to generate a single RF field variable, (e.g. two horns in anti-phase to generate a field derivative), the phase and amplitude relationships between those horns must be very tightly controlled to prevent some of the power coupling into other field variables. If the derivative signal were to be split between separate modulators driving different horns, (as would be required in the traditional four-horn arrangement), then very tight calibrations on the modulating devices would be required. With the five-horn arrangement, however, the phase and amplitude relationships between the two horns in each outer pair is fixed and can be adjusted as part of the setting up procedure in the test chamber to ensure the signals from the horns are in exact antiphase at the seeker position.

Furthermore the invention provides for the improved management of dynamic ranges. In the traditional four-horn arrangement, the field amplitude and derivative signals are required to be distributed between all four horns, which must therefore accommodate the combined dynamic ranges of all the variables. However, with the new five-horn arrangement, only the two outer channels need carry the extra dynamic range for the field derivative terms.

Other advantages and improvements over state of the art system will be readily apparent to those skilled in the art and such embodiments and alternative embodiments which utilise the inventive concept of the disclosure contained herein are considered included within the scope of the claimed invention.

What is claimed is:

1. A complex radar target emitter comprising independent control of three radio frequency radiation field characteristics, said field characteristics including:
   i) the real and imaginary components of the complex amplitude of the radiation field,
   ii) the spatial derivative of the real and imaginary components of the complex amplitude in one of two orthogonal planes and,
   iii) the spatial derivative of the real and imaginary components of the complex amplitude in the other of said two orthogonal planes.

2. A complex radar target emitter as claimed in claim 1, wherein said emitter comprises five horns for emitting radio frequency radiation.

3. A complex radar target emitter as claimed in claim 2, wherein one of said five horns is used to control the amplitude of the radio frequency radiation field, and the remaining four horns are arranged in two pairs, the horns in each of the two pairs being linked in anti-phase, the two pairs of horns being for generating the spatial derivatives of the real and imaginary components of the complex amplitude in each of said two orthogonal planes respectively.

* * * * *